Figure 1:
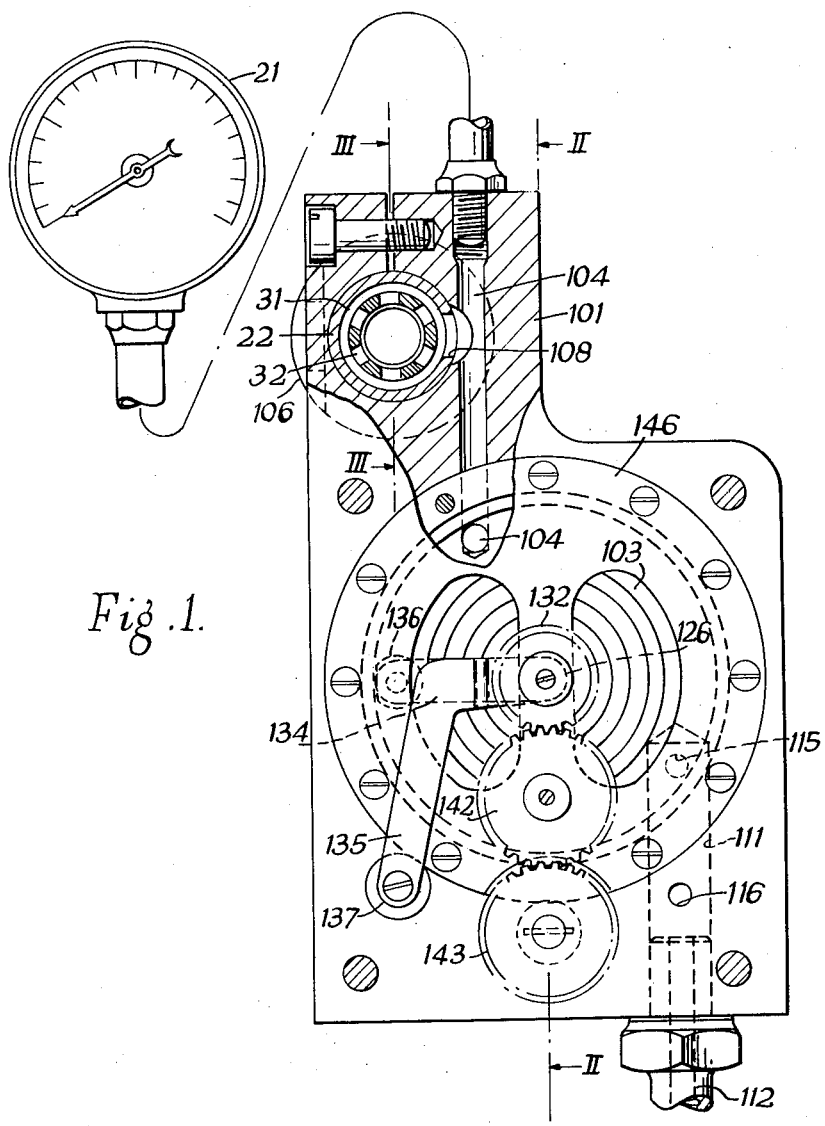

May 1, 1962 F. POCOCK ET AL 3,031,883
APPARATUS FOR TESTING A LENGTH OF CIGARETTE OR LIKE ROD
Filed June 9, 1959 4 Sheets-Sheet 1

INVENTOR.
Frederick Pocock and
Ronald A. Ahern
BY
Watson, Cole, Grindle & Watson
ATTORNEY May 1, 1962 F. POCOCK ET AL 3,031,883
APPARATUS FOR TESTING A LENGTH OF CIGARETTE OR LIKE ROD
Filed June 9, 1959 4 Sheets-Sheet 4
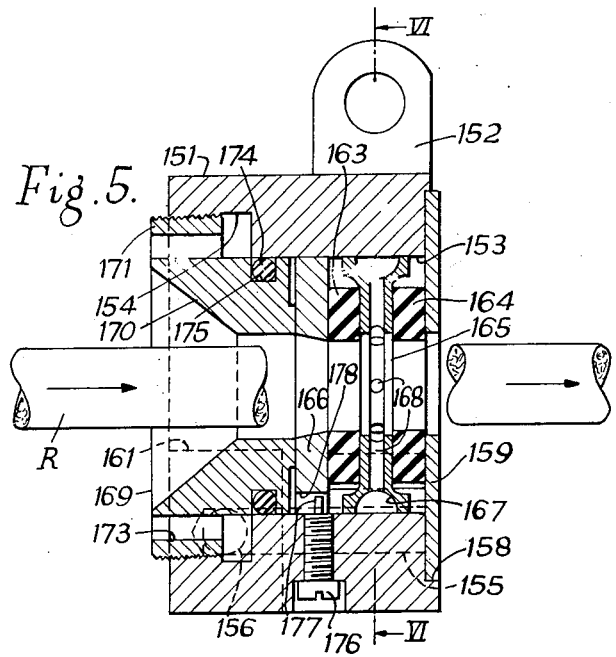
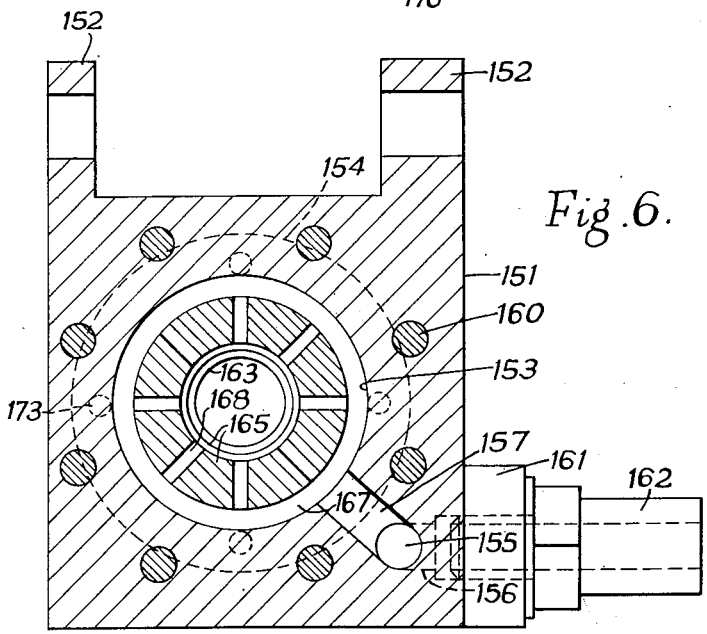
INVENTOR
Frederick Pocock
Ronald A. Ahern
BY
Watson, Cole, Grindle & Watson
ATTORNEYS

United States Patent Office 3,031,883
Patented May 1, 1962

3,031,883
APPARATUS FOR TESTING A LENGTH OF CIGARETTE OR LIKE ROD
Frederick Pocock and Ronald Albert Ahern, Deptford, London, England, assignors to Molins Machine Company Limited, London, England, a British company
Filed June 9, 1959, Ser. No. 819,177
Claims priority, application Great Britain June 16, 1958
11 Claims. (Cl. 73—37.6)

This invention concerns improvements in or relating to apparatus for testing a length of cigarette or like rod (e.g. testing a continuous rod on a cigarette-making machine).

In the complete specification and drawings of United States Patent No. 2,952,262, granted September 13, 1960, there is disclosed a device for testing the cross-sectional size of a continuous cigarette or filter plug rod, comprising a chamber to which air is supplied under pressure, through a control orifice, the chamber having an outlet orifice which is partly blocked by the rod, so that the effective area of the outlet (that is the gap between the rod and the outlet orifice) through which air escapes from the chamber, is determined by the cross-sectional size of the rod passing through. Thus variations in the cross-sectional size of the rod cause variations in the air pressure in the chamber, and these pressure variations can be utilized to detect variations from a standard cross-sectional size which it is desired that the rod should have.

In the device described in the above-mentioned specification, the pressure variations in the chamber cause movement of a diaphragm one side of which is in contact with the air in the chamber while the other side is subjected to a constant pressure. The pressures are suitably adjusted so that when the rod being tested is of the required standard size, the diaphragm is in a zero position, from which it can be moved, by variations of pressure in the chamber, in one direction or the other, these movements being used to actuate some suitable device, for example to eject cigarettes whose cross-sectional size is found to exceed or fall short of certain limits.

Cigarette manufacturers commonly make cigarettes and filter plugs in a range of sizes differing not only in length but in diameter. Accordingly the device mentioned above may be required to be used for testing rods whose desired standard cross-sectional sizes are different. If the outlet orifice of the chamber remained the same size when such rods of different standard size were tested, the effective area of the air escape outlet (i.e. of the gap between the standard rod and the orifice) would differ correspondingly, and the pressure within the chamber would thus also differ. This would make it necessary to adjust the arrangements for (for example) ejecting faulty cigarettes. Moreover, it would affect the sensitivity of the testing device, since in order to obtain the greatest sensitivity of response of the chamber, it is desirable to maintain a certain relationship between the pressure at which air is supplied to the chamber and the mean pressure within the chamber on the one hand, and on the other hand the area of the inlet to the chamber and the mean effective area of the air escape outlet (that is, the gap between the outlet orifice and a rod of standard size). Since in the device referred to it is desired to maintain the supply pressure and the inlet area constant in order to maintain the "scale" of the measurement constant, the desired relationship just mentioned can be maintained only if the effective area of the air escape outlet is the same whatever size of rod it is desired to make.

To achieve this, interchangeable parts providing orifices of different size can be provided for use in the testing device when cigarettes of different diameters are to be made, the orifices being of suitable sizes to provide a constant air escape area when used with rods intended to be made to any particular cross-sectional sizes (referred to for convenience herein as the "desired standard size").

There are, however, cases in which a cigarette manufacturer wishes to make cigarettes which do not necessarily conform to any particular desired standard cross-sectional size. For example he may wish to vary the size in order to vary the tightness or compactness of filling of the cigarettes, or he may, for any other reason, wish to make cigarettes whose cross-sectional size is arrived at by trial and adjustment of the garniture, rather than determined by any particular standard.

For such cases it is inconvenient, and may be quite impracticable, to supply such a range of interchangeable parts as would satisfy all such requirements.

Similar situations may arise in the manufacture of plugs, such as filter plugs, for mouthpiece cigarettes, by a continuous rod process.

The expression "a cigarette or like rod" when used herein is intended to refer to a cigarette rod or any rod (such as a filter plug rod), which is formed by enclosing a core in an outer wrapper in a similar manner to that employed in the production of a continuous cigarette rod.

According to the present invention there is provided a device for testing a cigarette or like rod, comprising a chamber having an inlet for air and an outlet orifice through which the rod is passed and through which air escapes from the passage by flowing past the rod, the said orifice being adjustable in size.

The said orifice may be defined by at least one apertured member whose shape can be altered so as to enlarge and contract the aperture. The said apertured member may be of deformable and resilient material whereby the aperture can be enlarged or contracted by change of pressure exerted (e.g. endwise) on the member.

The device may comprise a tubular guide for the rod, the said guide being capable of exerting pressure against the said apertured member and axially movable relatively to the said member to cause enlargement or contraction of the said aperture. The device may further comprise a tubular passage through which the rod passes and which communicates with the chamber, the said apertured member being located within the said passage. The said tubular guide for the rod may be threaded into a fixed part of said passage so as to be movable axially thereof by being rotated.

Two apertured members of deformable and resilient material may be located in the said passage, one on either side of a position at which the passage communicates with the said chamber, both said members being so arranged as to be capable of being deformed by pressure exerted endwise against them. The device may comprise a spacing member arranged between the two said members, the said spacing member being perforated to admit air from the said chamber into the said passage.

The device may further comprise means, for example a thrust bearing, located between an apertured member and the said threaded guide to reduce any tendency for compound stress to be transmitted to the said members by the said guide on rotation of the latter. There may be provided a pressure gauge communicating with the said chamber to indicate the air pressure therein.

Further according to the invention there is provided a device for testing or measuring a cigarette or like rod, comprising a tubular passage for the rod, a chamber communicating with the interior of said passage, an inlet to said chamber and means to supply air through said inlet under pressure, apertured members within the said passage, whose apertures are arranged to accommodate a rod passing through the passage, and provide outlets for air from the chamber, the said members being deformable by pressure so as to alter the size of the apertures, and means (e.g. a screw-threaded part) arranged to be capable of exerting desired pressure against the said apertured members so as to alter the size of the apertures.

Still further according to the invention there is provided a cigarette rod guide comprising at least one member having an aperture for the cigarette rod to pass through, the said member being deformable (e.g. made of deformable and resilient material) to alter the size of the said aperture.

Figure 2:
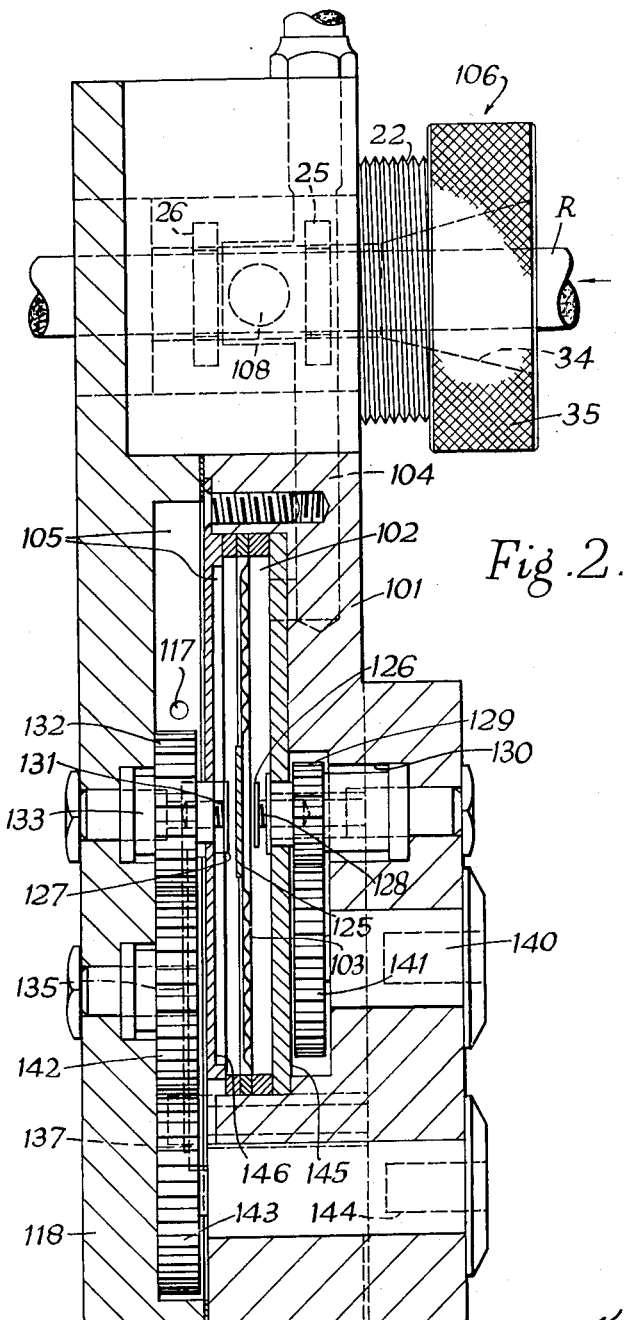
Figure 3:
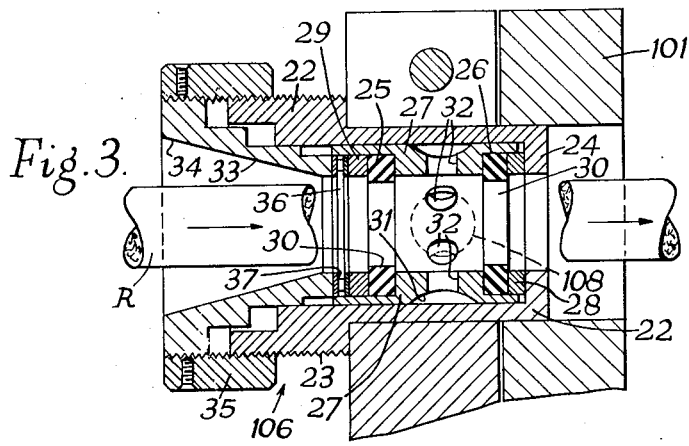
Figure 4:
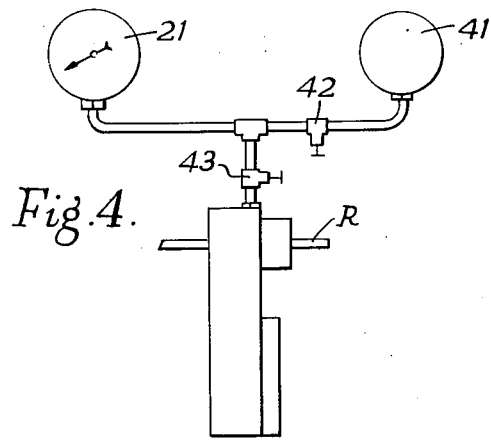
Figure 7:
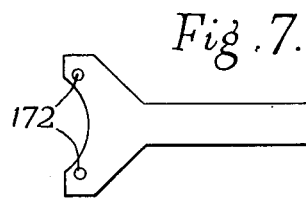

A device in accordance with the invention will now be described by way of example with reference to the accompanying drawings, in which:

FIGURE 1 is an end view, partly in section,
FIGURE 2 is a section on the line II—II, FIGURE 1,
FIGURE 3 is a section on the line III—III, FIGURE 1,
FIGURE 4 diagrammatically illustrates an arrangement including an integrating chamber,
FIGURE 5 is a sectional side view, similar to FIGURE 3, but illustrating a modified construction,
FIGURE 6 is a section on the line VI—VI, FIGURE 5, and
FIGURE 7 shows a tool for use with the device shown in FIGURES 5 and 6.

The device illustrated in FIGURES 1 to 3 is basically the same as that shown in FIGURES 5 to 8 of the drawings accompanying the specification of United States Patent No. 2,952,262 and FIGURES 1 to 3 correspond to a considerable extent to FIGURES 5 to 7 respectively, of the drawings of the above-mentioned specification. For convenience in comparison, therefore, the reference numerals used in the above-mentioned FIGURES 5 to 7 will as far as applicable be used in the present description in relation to FIGURES 1 to 3 of the accompanying drawings.

The device comprises a metal block 101, within which is an enclosed circular recess which is divided into two compartments 102, 105, by a metal diaphragm 103. At one side of the diaphragm the recess compartment 102 communicates with a conduit 104, while the compartment 105 at the other side of the diaphragm is a pressure compartment.

A tubular passage generally indicated by the reference 106, and which will be described in detail later, is clamped in the block 101. This passage acts as a guide for a cigarette rod R as shown in FIGURES 2 and 3 and its interior is in communication with the conduit 104 by way of a hole 108, FIGURES 1 and 3.

Air inlet passages 115 and 116 leading from an inlet passage 111 and pipe 112 are provided so as to admit air under pressure to the two compartments 102 and 105 respectively on both sides of the diaphragm, and are arranged so that the air is at approximately the same pressure in both compartments. The compartment 102 which communicates with the conduit 104 constitutes (together with the conduit 104, the hole 108 and part of the interior of the passage 106) a sensitive chamber in which the air pressure depends on the rate at which air can enter through the air inlet or control orifice 115 and escape past the rod. An outlet passage 117 allows air to escape from the pressure compartment 105 at the same rate at which air can escape from the sensitive chamber when a cigarette rod of standard cross section is in the passage or guide 106.

The conduit 104 is also connected with a pressure gauge 21 as shown in FIGURES 1 and 4.

The pressure compartment 105 is enclosed by a casing 118 secured to the block 101.

The diaphragm 103, which is metallic, has a flat central portion 125 which acts as a contact element. Two further adjustable contact elements 126 and 127 are located one on each side of the element 125. The elements 126 and 127 are rigidly mounted but are adjustable towards and away from the diaphragm. The element 126 is fixed to a screw 128 which is threaded through a gear 129 freely rotatable within a recess 130 in the block 101. The element 127 is similarly fixed on a screw 131 threaded through a gear 132 located in the pressure compartment and having a boss 133 which is freely rotatable in a recess in the casing 118.

The contact elements 126 and 127 have extensions 134 and 135 respectively, which are clamped at 136 and 137 respectively to prevent rotation of the screws 128 and 131. Thus rotation of the gears 129 and 132 causes the screws 128 and 131 to move endwise so as to bring the adjustable contact elements closer to or further from the central element 125 formed on the diaphragm.

Rotation of the gear 129 is effected by turning a spindle 140, FIGURE 2, on which is mounted a gear 141 meshing with the gear 129. Similarly the gear 132 is rotated by a train of gears 142 and 143, the gear 143 being mounted on a spindle 144 which can be turned to adjust the position of the contact element 127.

The gears 129 and 132 have bosses which extend into apertures in plates 145 and 146 respectively, which plates prevent endwise movement of the gears when they are rotated.

The contact elements 126 and 127 and their extensions 134 and 135 are insulated from the metal block 101 and casing 118, and are connected to an electrical device operable to actuate a signal or a control device of any suitable kind. The metal diaphragm 103 is also connected to this electrical device through the metal block 101, the connections being such that engagement of either of the elements 126 and 127 by the contact element 125 of the diaphragm closes a circuit in the electrical device.

Thus variations in the pressure in the sensitive chamber can be utilised to actuate some suitable device by which unsatisfactory cigarettes can be rejected or the rate of feed of tobacco for forming the rod can be regulated.

The rod guide, generally indicated by the reference numeral 106, will now be described. The corresponding rod guide shown and described in the specification and drawings referred to above is constructed as a single part. In the present construction, the rod guide is constructed in such a way as to enable the size of the openings through which the rod passes, and through which air escapes from the chamber, to be changed as required.

The guide comprises a tubular part 22 which is clamped in the block 101, and which is externally threaded at 23, FIGURE 3. The part 22 has at one end an annular flange 24. Accommodated inside the tubular part 22 are a pair of apertured discs 25 and 26 which are made of silicon rubber of a grade such that the discs are easily deformable on pressure and sufficiently elastic to enable them to return to their original shape when pressure is removed. These are located and held in position by a tubular spacing member 27 cooperating with a pair of washers 28 and 29, the washer 28 being located against the flange 24.

The apertures defined by internal faces 30 of the discs 25 and 26 are smaller in diameter than the internal diameters of the member 27, washers 28 and 29, and flange 24.

The member 27 has a wide circumferential groove 31 in its external surface, and a series of holes 32 extending from the groove 31 to the interior of the member 27. The groove 31 is located in register with the hole 108 formed in the part 22, and thus the interior of the member 27 (being in communication with the conduit 104) forms part of the sensitive chamber referred to above. The effective air escape outlet from the chamber is thus formed by the gap between the rod R and the internal faces 30 of the discs 25 and 26.

The rod guide also includes a further tubular part 33 which has a sliding fit in the part 22 and whose inner surface is flared outwardly at 34, FIGURE 2, to provide a lead for the rod. An internally threaded sleeve 35 secured at one end of the part 33 is screwed on to the threaded part 23 of the part 22 to connect the parts 22 and 33 together. A thrust bearing 36 is located between the washer 29 and the inner edge 37 of the tubular part 33. This is to enable the part 33 to be screwed on to the part 22 in such a way as to exert axial pressure against the silicon rubber discs 25 and 26 through the washer 29 and member 27 without imparting any twisting or rotary motion to the discs such as to distort them by shearing action.

The pressure exerted against the rubber discs 25 and 26 by the part 33 can be varied, by screwing it a greater or less distance into the member 22, so as to alter the size of the apertures defined by the internal faces 30 of the discs. Thus if the part 33 is moved towards the discs, the latter are compressed axially and thus expand radially inwardly so as to reduce their apertures, and if this pressure is relaxed by moving the part 33 in the reverse direction, the resilient rubber discs tend to regain their original shape and expand axially and contract radially, and the apertures are thus increased in diameter. It will therefore be seen that the size of the air escape outlet from the sensitive chamber can be controlled by suitably turning the part 33 by means of the threaded sleeve 35.

The arrangement described can be used in a number of different circumstances. For example it may be found desirable to adjust the size of the air escape outlet in order to alter the ratio of the latter size to that of the air inlet. The main purpose for which the arrangement is intended, however, is to adjust the size of the apertures in the discs 25 and 26 according to the cross-sectional size of the rod which is to be tested, so as to maintain the mean area of the air escape outlet substantially constant for different standard rod sizes, thus maintaining a desired relationship between the size of the air inlet aperture and the air escape aperture. As explained above, this is desirable in order to obtain the greatest sensitivity of response of the chamber—i.e. the greatest change of air pressure within the sensitive chamber for a given change in the size of the air escape outlet due to variations in the cross-sectional size of a rod being measured, over the widest range of variation.

Thus the arrangement shown can conveniently be set up, by suitable adjustment of the part 33, to provide a suitable air escape outlet when a "standard" rod of any desired size is passed through the rod guide. As explained in the specification referred to above, a "standard rod" of the desired cross-sectional size can be made of metal, but preferably is made of a material light enough to be centred and caused to "float" by the escaping air. When such a standard is inserted into the rod guide, the part 33 can be adjusted to adjust the size of the air escape outlet (by altering the shape of the discs 25 and 26 and the size of their apertures) until the pressure within the sensitive chamber, as indicated by the gauge 21, is at a desired value.

This procedure is suitable when it is desired to make cigarettes of a certain specified cross-sectional size, which may, of course, differ slightly from the nearest size commonly made.

For cases in which it is desired to decide on the cross-sectional size of the rod by trial, rather than by a predetermined standard, the device can be adjusted on the run, by suitable adjustment of the part 33, when cigarettes which are considered satisfactory are being produced. Thus the manufacturer may wish to increase or reduce the diameter of the cigarettes being made in order to change the compactness of filling, or the general appearance or "feel" of the cigarettes, and may wish to arrive at the preferred cross-sectional size of rod for such purposes by practical trial on the machine, for example by adjusting the setting of the garniture. When cigarettes are produced which possess the desired qualities, their cross-sectional size (or rather the size of the rod from which they are produced) is taken as the "standard," and the testing device can then be adjusted to bring the air pressure in the sensitive chamber to the desired value.

It will of course be understood that this desired value of the pressure in the chamber is a mean value—that is, it represents the chamber pressure when a rod of the desired cross-sectional size occupies the rod guide—and the testing device operates to detect variations from this mean value, and thus, in effect, variations in cross-sectional size of the rod from the desired size.

In order to assist the operation of adjusting the device in the case just mentioned, that is, while cigarette rod is produced, the device may be provided with an integrating chamber, connected to the sensitive chamber and the gauge 21 by a tap. The purpose of this is to put in a time constant into the indications shown by the gauge, in order to make adjustment easier, since the chamber pressure to which the device is to be adjusted is the mean chamber pressure resulting from the passing through the device of a rod which, although considered generally satisfactory for the required purposes, may nevertheless vary slightly in cross-sectional size from place to place along its length. Instead of an integrating chamber, a damping device of known kind could be used.

FIGURE 4 shows diagrammatically an arrangement in which an integrating chamber 41 is connected both to the sensitive chamber and to the gauge 21. A stopcock 42 is provided whereby the integrating chamber 41 can be cut off from the sensitive chamber and from the gauge 21 when desired, and a further stopcock 43 enables both the gauge and the integrating chamber to be disconnected from the sensitive chamber. Since, as pointed out above, the integrating chamber is provided in order to put in a time constant to facilitate adjustment of the device, it is not normally required once the adjustment is completed. It will also be understood that the gauge 21 is primarily required for adjustment of the device to obtain the desired mean value of the pressure in the sensitive chamber, and will not normally be required once this adjustment has been made. Accordingly both the stopcocks 42 and 43 can be turned off once the device has been suitably adjusted, and the gauge 21 can, if desired, be re-connected to the sensitive chamber at any subsequent time, without re-connecting the integrating chamber, by means of the stopcock 43.

In the apparatus shown, it is arranged that the rubber discs will be compressed equally. While this is not actually vital from the point of view of measurement, it is important since the clearance between the rod and the rubber discs is very small. If one is compressed more than the other, there will be a greater risk of an interference with a large diameter rod.

It will be appreciated that the arrangement described enables the cigarette manufacturer to adjust the testing device in a simple manner so as to enable it to deal satisfactorily with a range of rod sizes which may differ very minutely and which may be unrelated to any particular standard of rod size.

FIGURES 5 and 6 illustrate a rod guide constructed as a separate unit capable of being connected to a further unit which contains the sensitive chamber, diaphragm, pressure compartment, and other elements as shown in the lower part of FIGURES 1 and 2. This makes it practicable to provide a relatively small rod guide unit to be mounted on the cigarette-making machine, while permitting some choice in the positioning of the further unit, according to the construction of the machine or to the presence of other equipment. The rod guide can also, if desired, be connected to a pressure gauge and to an integrating chamber, which similarly can be located in some convenient position.

The rod guide unit shown in FIGURES 5 and 6 comprises a housing 151 provided with lugs 152 by which it can be fixed on the machine, and having a cylindrical bore 153 which is recessed at one end at 154. A duct 155 extending through the housing communicates at one end with a hole 156, which constitutes an air inlet, and near the other end with a hole 157 (FIGURE 6), communicating with the bore 153. A shallow recess 158 accommodates an apertured closure ring 159 which is fixed to the housing 151 by screws 160, FIGURE 6, and which seals the open end of the duct 155 as seen in FIGURE 5. The hole 156 extends through a boss 161 on the housing and is internally threaded to receive one end of a screwed pipe 162, by which connection can be made, as mentioned above, to a further unit or units.

Accommodated inside the cylindrical bore 153 are two apertured discs 163 and 164 made of silicon rubber. Between these two discs is a tubular spacing member 165. The disc 163 is held against the spacing member by a thrust washer 166, while the disc 164 is held between the spacing member and the closure ring 159.

The spacing member 165 has a circumferential groove 167 in its external surface, and a series of holes 168 extend from the groove 167 to the inner face of the tubular spacing member 165. The groove 167 is located in register with the hole 157, see FIGURE 6, and thus the interior of the spacing member (and hence the interior of the bore 153) are in communication with the air inlet pipe 162 by way of the hole 156, duct 155, hole 157, and the groove 167 and holes 168 in the spacing member.

As can be seen in FIGURE 5, the apertures defined by the internal faces of the silicon rubber discs 163 and 164 are slightly smaller in diameter than the internal diameters of the spacing member 165 and the closure ring 159. The internal face of the thrust washer 166 is tapered inwardly towards the rubber disc 163 so as to provide a lead for a cigarette rod passing through the guide.

A tubular part 169 which is internally flared outwardly at 170, FIGURE 5, fits within the bore 153 and has an externally threaded flange 171 which can be screwed into a threaded part of the surface of the recess 154, so as to secure the part 169 to the housing 151 and also to cause it to move axially relatively to the rubber discs 163 and 164. Rotation of the part 169 can be effected by a suitable tool such as is illustrated in FIGURE 7, having projections 172 which can enter holes 173 in the part 169.

A rubber sealing ring 174 is accommodated in a circumferential groove 175 in the outer surface of the part 169.

A locating screw 176 extending through the housing 151 has a small projection 177 which extends into a groove or notch 178 in the periphery of the thrust washer 166 to prevent the latter from rotating, while permitting the washer to move axially.

From the above description it will be seen that the arrangement shown in FIGURES 5 and 6 is essentially similar to that shown in FIGURES 1, 2 and 3 so far as it concerns the arrangement of the guide or passage for the cigarette rod R. Air entering the unit by the pipe 162 flows through the holes 168 in the spacing member 165, and escapes by flowing between the cylindrical surface of the rod R and the inner faces of the rubber discs 163 and 164. With the parts in the positions shown in FIGURE 5, the discs 163 and 164 are unstressed and their central apertures are therefore at their maximum diameter, which, however, is a little smaller than the diameter of the central apertures in the spacing member 165 and the closure ring 159.

On rotation of the flared tubular part 169 so as to move the latter axially inwardly, that is, towards the discs 163 and 164, the latter are axially compressed by pressure exerted by the part 169 through the thrust washer 166 and, in the case of the disc 164, also through the spacing member 165. Thus, as in the arrangement previously described with reference to FIGURES 1, 2 and 3, the deformable rubber discs 163 and 164 are compressed axially and expand radially inwardly to reduce their apertures. Rotation of the thrust washer 166 is prevented by the projection 177, and distortion of the rubber discs by shearing action due to the rotary motion of the part 169 is therefore avoided.

It will be appreciated that the unit just described can be connected, by means of the air inlet pipe 162, to any suitable and convenient device by which fluctuations in the rate of escape of air past the cigarette rod can be detected, and, if desired, to a pressure gauge by which such fluctuations can be indicated. For example the pipe 162 can be connected to a further pipe corresponding to the conduit 104, FIGURES 1 and 2, one end of the said further pipe being put in communication with a chamber such as the chamber 102, while the other end is connected to a pressure gauge such as the gauge 21, or to both a pressure gauge and an integrating chamber in the manner shown in FIGURE 4. When so connected, the device can be used in the manner described above with reference to FIGURES 1 to 4.

What we claim as our invention and desire to secure by Letters Patent is:

1. A device for testing a cigarette or like rod, comprising a chamber having an inlet for air and means to supply air through said inlet under pressure, outlet means and an outlet for air, the said outlet means defining an aperture through which the rod is passed lengthwise and through which the air flows past the rod to escape from the chamber, the said outlet means being adjustable to change the size of the aperture, and adjustment means to effect the change in size.

2. A device as claimed in claim 1, wherein the said outlet means is of deformable and resilient material whereby the aperture can be enlarged or contracted by change of pressure exerted on the member, and wherein the said means to adjust the member comprises adjustable pressure means acting on said deformable material.

3. A device as claimed in claim 1 comprising a pressure gauge communicating with the said chamber to indicate the air pressure therein.

4. A device as claimed in claim 2, wherein the said adjustment means comprises a tubular guide for the rod, the said guide being capable of exerting pressure against the said outlet means and axially movable relatively to the said member to cause enlargement or contraction of the said aperture.

5. A device as claimed in claim 4, comprising means defining a tubular passage through which the rod passes and which communicates with the chamber, and wherein the said outlet means is located within the said passage.

6. A device as claimed in claim 5, wherein the said tubular guide for the rod and the said means defining the passage are threaded together so that the former is moving axially of the latter by being rotated.

7. A device as claimed in claim 5, wherein two outlet means of deformable and resilient material are located in the said passage, one on either side of a position at which the passage communicates with the said chamber, both said outlet means being so arranged as to be capable of being deformed by pressure exerted endwise against them.

8. A device as claimed in claim 7, comprising a spacing member arranged between the two said outlet means, the said spacing member being perforated to admit air from the said chamber into the said passage.

9. A device as claimed in claim 6 comprising means, for example, a thrust bearing, located between an outlet means and the said tubular guide to reduce any tendency for compound stress to be transmitted to the said outlet means by the said guide on rotation of the latter.

10. A device for testing or measuring a cigarette or like rod, comprising means defining a tubular passage for the rod, a chamber communicating with the interior of said passage, an inlet to said chamber and means to supply air through said inlet under pressure, apertured members within the said passage, whose apertures are arranged to accommodate a rod passing through the passage, and provide outlets for air from the chamber, the said members being deformable by pressure so as to alter the size of the apertures, and means arranged to be capable of exerting desired pressure against the said apertured members so as to alter the size of the apertures.

11. In a continuous rod cigarette making machine, a cigarette rod guide comprising at least one member having an aperture for a continuous cigarette rod to pass through, the said member being made of deformable and resilient material, and adjustable pressure means arranged to press in a direction axially of the continuous cigarette rod against said member with variable pressure to alter the size of the said aperture.

References Cited in the file of this patent

UNITED STATES PATENTS

| | | |
|---|---|---|
| 2,792,569 | Byrkett | May 14, 1957 |
| 2,801,475 | Meyer | Aug. 6, 1957 |